United States Patent
Faulkner et al.

(10) Patent No.: US 7,529,348 B2
(45) Date of Patent: May 5, 2009

(54) METHOD OF PERFORMING INSERTION LOSS ESTIMATION

(75) Inventors: Roger Faulkner, Swindon (GB); Jeff Brzozowski, Brookfield, WI (US)

(73) Assignee: Tollgrade Communications, Inc., Wilmington, DE (US)

( * ) Notice: Subject to any disclaimer, the term of this patent is extended or adjusted under 35 U.S.C. 154(b) by 817 days.

(21) Appl. No.: 10/332,777

(22) PCT Filed: Jul. 16, 2001

(86) PCT No.: PCT/IB01/01273

§ 371 (c)(1),
(2), (4) Date: Dec. 22, 2003

(87) PCT Pub. No.: WO02/09400

PCT Pub. Date: Jan. 31, 2002

(65) Prior Publication Data

US 2004/0114527 A1 Jun. 17, 2004

(30) Foreign Application Priority Data

Jul. 19, 2000 (GB) .................................. 0017732.9

(51) Int. Cl.
*H04M 1/24* (2006.01)
*H04M 3/08* (2006.01)
*H04M 3/22* (2006.01)

(52) U.S. Cl. ........................... 379/1.04; 379/24; 379/28; 379/30

(58) Field of Classification Search ................. 379/1.01, 379/1.03, 1.04, 22, 22.01, 22.02, 22.07, 22.08, 379/23, 24, 27.03, 27.08, 28, 29.03, 30; 324/500, 324/522, 523, 425, 527, 533, 534
See application file for complete search history.

(56) References Cited

U.S. PATENT DOCUMENTS

| 3,882,287 A | 5/1975 | Simmonds |
| 4,087,657 A | 5/1978 | Peoples |
| 4,186,283 A | 1/1980 | Simmonds |
| 4,529,847 A | 7/1985 | DeBalko |
| 4,620,069 A | 10/1986 | Godwin et al. |

(Continued)

FOREIGN PATENT DOCUMENTS

EP 0 341 816 A1 11/1989

(Continued)

OTHER PUBLICATIONS

Boets, et al. "The Modelling Aspect of Transmission Line Networks," May 12, 1992, pp. 137-141.

(Continued)

*Primary Examiner*—Quoc D Tran
(74) *Attorney, Agent, or Firm*—The Webb Law Firm

(57) ABSTRACT

The present invention provides a method and apparatus for estimating the insertion loss of a telephone line. A complex waveform is applied to each wire of the telephone line being tested. Real and imaginary components of the resultant waveform are measured at a plurality of frequencies. Insertion loss of the line is estimated from a series of single-ended voltage measurements made at a plurality of frequencies. These measurements are captured and used to estimate the insertion loss of the telephone line.

55 Claims, 3 Drawing Sheets

U.S. PATENT DOCUMENTS

| | | |
|---|---|---|
| 4,868,506 A | 9/1989 | DiStefano |
| 5,025,221 A | 6/1991 | Blaess |
| 5,083,086 A | 1/1992 | Steiner |
| 5,121,420 A | 6/1992 | Marr et al. |
| 5,128,619 A | 7/1992 | Bjork et al. |
| 5,157,336 A | 10/1992 | Crick |
| 5,270,661 A | 12/1993 | Burnett |
| 5,302,905 A | 4/1994 | Crick |
| 5,319,311 A | 6/1994 | Kawashima et al. |
| 5,400,321 A | 3/1995 | Nagato |
| 5,402,073 A | 3/1995 | Ross |
| 5,404,388 A | 4/1995 | Eu |
| 5,436,953 A | 7/1995 | Nilson |
| 5,461,318 A | 10/1995 | Borchert et al. |
| 5,465,287 A | 11/1995 | Egozi |
| 5,528,661 A | 6/1996 | Siu et al. |
| 5,528,679 A | 6/1996 | Taarud |
| 5,606,592 A | 2/1997 | Galloway et al. |
| 5,629,628 A | 5/1997 | Hinds et al. |
| 5,636,202 A | 6/1997 | Garney |
| 5,680,391 A | 10/1997 | Barron et al. |
| 5,699,402 A | 12/1997 | Bauer et al. |
| 5,758,027 A | 5/1998 | Meyers et al. |
| 5,790,523 A | 8/1998 | Ritchie, Jr. et al. |
| 5,864,602 A | 1/1999 | Needle |
| 5,870,451 A | 2/1999 | Winkler et al. |
| 5,881,130 A | 3/1999 | Zhang |
| 5,937,033 A | 8/1999 | Bellows |
| 5,956,386 A | 9/1999 | Miller |
| 5,978,449 A | 11/1999 | Needle |
| 6,002,671 A | 12/1999 | Kahkoska et al. |
| 6,014,425 A | 1/2000 | Bingel et al. |
| 6,026,145 A | 2/2000 | Bauer et al. |
| 6,084,946 A | 7/2000 | Beierle |
| 6,091,338 A | 7/2000 | Natra |
| 6,091,713 A | 7/2000 | Lechleider et al. |
| 6,107,867 A | 8/2000 | Lakshmikumar |
| 6,111,861 A | 8/2000 | Burgess |
| 6,115,466 A | 9/2000 | Bella |
| 6,118,860 A | 9/2000 | Hillson et al. |
| 6,154,447 A | 11/2000 | Vedder |
| 6,169,785 B1 | 1/2001 | Okazaki |
| 6,177,801 B1 | 1/2001 | Chong et al. |
| 6,181,775 B1 | 1/2001 | Bella |
| 6,192,109 B1 | 2/2001 | Amrany et al. |
| 6,205,202 B1 | 3/2001 | Yoshida et al. |
| 6,209,108 B1 | 3/2001 | Pett et al. |
| 6,215,854 B1 | 4/2001 | Walance |
| 6,215,855 B1 | 4/2001 | Schneider |
| 6,226,356 B1 | 5/2001 | Brown |
| 6,240,177 B1 | 5/2001 | Guntzburger et al. |
| 6,256,377 B1 | 7/2001 | Murphree et al. |
| 6,263,047 B1 | 7/2001 | Randle et al. |
| 6,263,048 B1 | 7/2001 | Nelson et al. |
| 6,266,395 B1 | 7/2001 | Liu et al. |
| 6,285,653 B1 | 9/2001 | Koeman et al. |
| 6,292,468 B1 | 9/2001 | Sanderson |
| 6,292,539 B1 | 9/2001 | Eichen et al. |
| 6,349,130 B1 | 2/2002 | Posthuma et al. |
| 6,366,644 B1 | 4/2002 | Sisk et al. |
| 6,385,297 B2 | 5/2002 | Faulkner et al. |
| 6,389,109 B1 | 5/2002 | Schmidt et al. |
| 6,445,733 B1 | 9/2002 | Zuranski et al. |
| 6,456,694 B1 | 9/2002 | Posthuma |
| 6,463,126 B1 | 10/2002 | Manica et al. |
| 6,466,647 B1 | 10/2002 | Tennyson |
| 6,487,276 B1 | 11/2002 | Rosen et al. |
| 6,507,870 B1 | 1/2003 | Yokell et al. |
| 6,614,880 B1 | 9/2003 | Lysaght et al. |
| 6,687,336 B1 | 2/2004 | Holeva |
| 6,741,676 B2 | 5/2004 | Rudinsky et al. |
| 6,781,386 B2 | 8/2004 | LeHenaff |
| 6,895,081 B1 * | 5/2005 | Schmidt et al. ............ 379/1.01 |
| 7,012,991 B1 * | 3/2006 | Faulkner .................... 379/1.04 |
| 7,071,703 B2 * | 7/2006 | Faulkner ..................... 324/539 |
| 2002/0089999 A1 | 7/2002 | Binde |
| 2003/0048756 A1 | 3/2003 | Chang et al. |

FOREIGN PATENT DOCUMENTS

| | | |
|---|---|---|
| EP | 0722164 A1 | 7/1996 |
| WO | WO 91/11872 | 8/1991 |
| WO | WO 98/44428 A1 | 10/1998 |
| WO | WO 99/63427 A1 | 12/1999 |
| WO | WO 00/27134 | 5/2000 |
| WO | WO 00/64132 | 10/2000 |
| WO | WO 01/01597 A1 | 1/2001 |
| WO | WO 01/24490 | 4/2001 |
| WO | WO 01/67729 A1 | 9/2001 |

OTHER PUBLICATIONS

Chiu et al. "Loop Survey in the Taiwan Area and Feasibility Study for HDSL," IEEE, vol. 9, No. 6, Aug. 1991, pp. 801-809.

Goralski, "xDSL Loop Qualification and Testing," IEEE Communications Magazine, May 1999.

Harris Communications, National Communications forum Presentation, Chicago, IL Oct. 5, 1998.

Hedlund, et al., DSL Loop Test Telephony, vol. 235, No. 8, Aug. 24, 1998.

"Loop Qualification, Prerequisite for Volume xDSL Deployment," The TeleChoice Report on xDSL, vol. 2, No. 3, Mar. 1997.

Stewart, "Testing ADSL: The Easier the Better, America's Network," Dec. 15, 1998 pp. 24-27.

Turnstone Systems, Inc., Product Literature and Presentation at Turnstone Systems, Inc., Sep. 1992.

Roehrkasten, "Meassung Von SDSL—Parametern", Nachrichtentechnik Electronik, DE Veb Verlag Technik. Berlin, vol. 48, No. 2, Mar. 1, 1998, pp. 20-21.

Rye Senjen et al, "Hybrid Expert Systems for Monitoring and for Diganosis", proceedings of the Conference on Artificial Intelligence for Applications, IEEE, Comp. Soc. Press. vol. Conf. 9, Mar. 1, 1993, pp. 235-241.

Woloszynski, "It's Here," Bellcore Exchange Magazine, Jun. 1998.

* cited by examiner

METHOD OF PERFORMING INSERTION LOSS ESTIMATION

CROSS REFERENCE TO RELATED APPLICATIONS

This application is the United States national phase of International Application No. PCT/IB01/01273, filed on Jul. 16, 2001, which, in turn, claims priority to United Kingdom Application No. 0017732.9 (now GB 2365253), filed on Jul. 19, 2000.

BACKGROUND OF THE INVENTION

This invention relates generally to communication networks and more particularly to systems for qualifying telephone lines for data transmission. As is known in the art, public switch telephone networks, i.e., so-called plain old telephone service (POTS) lines, were originally designed for voice communications, which cover a limited frequency bandwidth (i.e., about 4 KHz). Today, it is desired to use the same POTS lines for data transmission. Data signals, however, generally have different frequency characteristics than voice signals. As a result, a POTS line that works well transmitting voice signals might not work well, or may not work at all, for data signals. Telephone companies need to know which lines are suitable, i.e., qualify, and which lines are not suitable for data transmission. Telephone companies also need to know the reason why particular lines are unable to support data transmissions and where such faults occur so they can determine whether the transmission line can be corrected.

There are problems for telephone operating companies (Telco's) attempting to qualify subscriber loops for delivery of data. One problem is strategic. Telco's are reluctant to deploy emerging technologies for the delivery of data transmission services (e.g., ISDN or ADSL) because there is uncertainty in their knowledge that sufficient of the subscriber loops are of high enough quality to make deployment economically successful. This discourages early adopters because there is significant risk in being first to deliver a technology that may not work in their access network. If Telco's could be given a technology to take much of this risk out of initial deployment, they can secure market share and lead in the face of competition.

An additional problem is tactical and comes after a Telco has made a decision to deploy a particular technology. There is a need to qualify, either pro-actively or reactively, specific lines for service as that service is requested by subscribers or targeted by the Telco for delivery. There are a number of factors which decrease the end to end data transmission rate attainable on a pair of wires of a telephone line. Some of these factors are imbalanced lines, contact faults and the like. Given that a telephone line has no other parasitic conditions or noise interferers, the operation of the service on the line ultimately depends on the overall attenuation or insertion loss of the wire pair to the signal applied. Currently telephone companies measure insertion loss by deploying personnel to either end of the wire pair to measure the insertion loss at different frequencies (e.g. 100 kHz, 300 kHz, etc.) through hand held instruments. This procedure is expensive, labor intensive, and time consuming. It would be desirable to have an apparatus and method for estimating the insertion loss of a line for data transmission services, and further that the method and apparatus be simple to implement, efficient, and not require the deployment of personnel to remote locations.

SUMMARY OF THE INVENTION

With the foregoing background in mind, it is an object of the present invention to provide a method and apparatus for accurately estimating the insertion loss of a telephone line. Insertion loss of the line is estimated from a series of single-ended voltage measurements made at a plurality of frequencies. A complex waveform having multiple frequencies is applied to the telephone line being tested. Real and imaginary components of the resultant waveform are measured. These measurements are captured and used to accurately estimate the insertion loss of the telephone line at one or more frequencies. From the estimated insertion loss a determination of the data service supportable by the line can be made.

BRIEF DESCRIPTION OF THE DRAWINGS

The invention will be better understood by reference to the following more detailed description and accompanying drawings in which.

DETAILED DESCRIPTION

Figure 1:
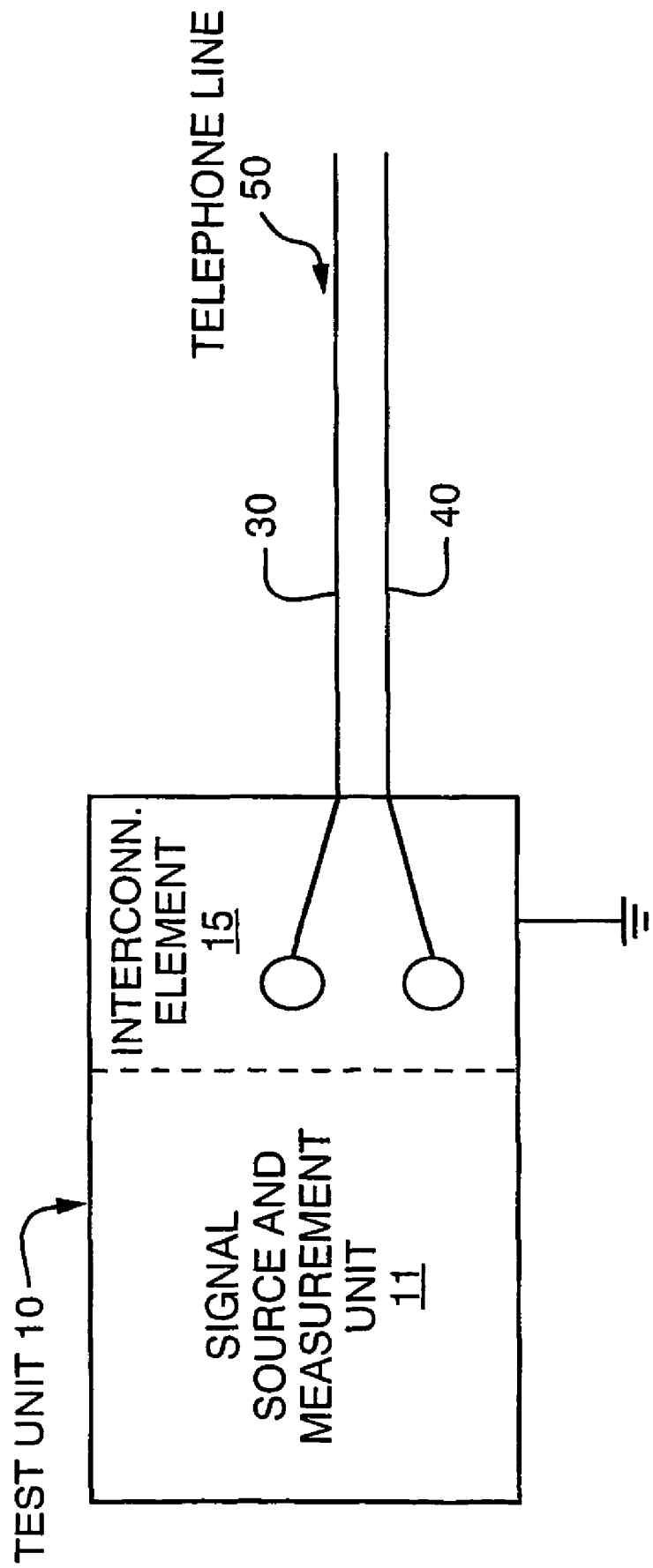
FIG. 1 is a block diagram of the remote measuring unit coupled to a line under test.

The telephone network was originally designed for voice communication. Voice communication covers a limited frequency bandwidth. In some cases, telephone lines were optimized for signals with this frequency range (approximately 4 kHz). Even where the lines were not optimized for voice signals, there was no incentive to make the lines operate at other frequencies and often they did not. Now, it is desired to use those same lines to carry data signals. The data signals generally have different frequency characteristics than the voice signals. As a result, a line that works very well transmitting voice signals might not work well or at all for data signals. Phone companies need to know which lines will work for data signals in order to offer data services to customers of those lines.

The present invention provides a method and apparatus for estimating the insertion loss of one or more telephone lines. The estimate is independent of cable fill (lines within a bundle which are actually connected to a line circuit) and represents the loss between the wire pairs (known as A and B or Tip and Ring) along with any associated coupling to adjacent wire pairs. For any such estimate to be practical the termination device on the line does not have any effect on the estimate. Additionally, the cable gauges and wire material is accounted for.

An A/B pair in a bundle of wires is capacitively coupled between A and B and is also capacitively coupled to surrounding adjacent wires. The combination of such capacitive coupling presents a mutual capacitance value. For any given distance, such mutual capacitance values across the pair are coupled resistively through the distributed resistance of the wire along the length of the pair.

Thus, for any potential difference across the pair the capacitive mutual coupling tends to conduct AC and more so as frequency increases. This is then tempered by the distributed resistance in the pair tending to resist current flow but is frequency independent.

Cable is procured on the basis of a fixed value of mutual capacitance (e.g. 54 nF per km), as far as is possible cable is procured at this value regardless of cable gauge. Essentially because this mutual capacitance value is fixed or varies by only a small to moderate amount for different cables, the load presented to an AC drive varies by length, (the total sum of the capacitive coupling for a pair) and by cable resistance. The cable resistance changes by large amounts depending on the cable gauge and material, e.g. smaller gauges are much more resistive preventing current flow, aluminum is more resistive that copper and therefore prevents current flow more than copper for the same cable gauge.

For a fixed real length of cable, for example one km, the mutual capacitance contribution would remain fixed (e.g. at 54 nF) but the impedance measured at one end would vary with higher impedance being seen through small gauge cables than through large gauge cables. Similarly if the cable were 2 km long the mutual capacitive coupling would be 108 nF but again cable gauge affects the impedance being presented to the measurement system.

AC current flow to earth is dependent upon cable fill (i.e. lines connected to a line circuit present an earth path). Adjacent wire pairs affect overall loss of data signals whether they are part of the fill or not. In any estimation of insertion loss it is important to either:

1) greatly reduce any current flowing to earth from the pair under test caused by a variable unknown fill level, or,
2) by other means negate the effect of this variable fill.

This disclosure gives two means by which the estimation of insertion loss can be made independent of cable fill. These means are as follows:

In order to reduce current flowing from the pair under test to the adjacent pairs the complex drive voltage can be driven onto either leg of the pair but with a phase difference of 180 degrees (later referred to as drive/-drive) between the two wires to maximize the potential difference between the legs of the pair. Additionally the signal generation can be isolated from earth in the test head to eliminate a return current path.

To negate the effect of the cable fill even when the signal being driven onto the pair in common mode (later referred to as drive/drive) it is possible to eliminate much of the effect of cable fill by adjusting the estimate of insertion loss by examining the high frequency behavior of the complex waveform applied.

Referring to FIG. 1, a block diagram of the present invention 10 is shown coupled to a selected telephone line 150. The test unit 10 includes an interconnection element 15, and a signal source and measurement unit 11. The test unit 110 measures the wires 30 and 40 of a selected telephone line 50.

The test unit 10 comprises a hardware/software system specifically developed for estimating insertion loss of a telephone line. The software includes commands for applying a complex waveform having a plurality of frequencies to a telephone line (for example the complex waveform may have approximately 45 different frequencies), commands for directing the test unit to measure the voltages of the telephone line, and commands for calculating the estimated insertion loss of the telephone line from the measurements. Other functions such as predicting the line length may also be provided by the test unit. The test unit 10 also includes storage for storing the values of the measured variables as well as storing the commands associated with estimating the insertion loss of the selected telephone line.

In a first embodiment, the A/B wires 30 and 40 of the selected telephone line 50 are placed in communication with the signal source. The signal source is applied differentially (drive/-drive) to the A/B pair, optionally the test head instrumentation can be isolated from earth which will give more accurate estimations of loss.

Modems, either analog or ADSL, apply their tones to the phone line differentially and without reference to earth. A good method of assessing a lines performance to such tones is by use of field instrumentation to assess the insertion loss of the line. Such equipment couples the tone transmitter and tone receiver to the line via transformers giving isolation from earth. In any event, field equipment does not enjoy ready access to earth for reference anyway. In summary, both modems and the primary method of assessing line performance have no reference to earth; therefore currents do not flow to earth when transmitting modem tones or when measuring insertion loss by known dual ended techniques. Thus, a loss based estimate for a line may be obtained that mimics dual ended insertion loss measurements provided that the current flowing in the load presented by the line is mainly between the A and B wires of the line and that no current or very little current is flowing to earth.

The test unit 10 applies a complex waveform on each of the A/B wires 30 and 40 in what is known as a drive/-drive configuration. Measurements of both real and imaginary voltage components over a number of frequencies from approximately 100 Hz to approximately 20 kHz are made. The voltage measurements at the lower frequency could be affected to a small extent by the telephone-terminating device; this effect is reduced by using drive voltages of 500 mV or less. Alternately a fixed reference value may be substituted for frequencies at around 100 Hz, the value based upon the output of the signal source at that frequency. The next four or more frequencies having measurable real and imaginary voltage components are used to describe a loss-based trend.

The test unit 10 utilizes the measurement unit to measure real and imaginary components of the resultant waveform between the wires 130 and 140. These measurements are done at a plurality of frequencies. For example, the measurements are made at five frequencies. The five frequencies are between 0 and 20 kHz, and are designated as $f_1$, $f_2$, $f_3$, $f_4$, and $f_5$. The voltage measurements include real components of the voltages, designated $V_{Real}$, and imaginary components of the voltages, designated $V_{Imag}$. Thus the real and imaginary voltage measurements at each frequency are designated $V_{Real}@f_1$, $V_{Imag}@f_1$, $V_{Real}@f_2$, $V_{Imag}@f_2$, ... $V_{Real}@f_5$, $V_{Imag}@f_5$. Test unit 10 utilizes these voltage measurements to estimate the insertion loss of the selected telephone line according to the formula:

$$k \cdot \log_{10}(((V_{Real}@f_2)^2 + (V_{Imag}@f_2)^2 + (V_{Real}@f_3)^2 + (V_{Imag}@f_3)^2 + (V_{Real}@f_4)^2 + (V_{Imag}@f_4)^2 + (V_{Real}@f_5)^2 + (V_{Imag}@f_5)^2)/(X))$$

where k is a constant related to a data access rate and X is a reference value.

The constant k is a value, which varies in accordance with the desired level of service the line is being qualified for. For example at a first level of service k would be a first constant such as 84, while at a second level of service k would have a different value such as 130. Reference value X is either the value:

$$4 \times (|V_{open}|)^2$$

or $$4 \times ((V_{Real}@f1)^2 + (V_{Imag}@f1)^2)$$

where $V_{open}$ is the open line output of the test unit.

The number arrived at by the method comprises the estimated insertion loss at 300 kHz in decibels. The above-described method utilizes the differential drive/-drive to remove or minimize the effects of cable fill, which would otherwise affect the estimation of the insertion loss.

The same measurements and formulae described above could also be used in a configuration where there is no isolation from ground by utilizing a drive/drive configuration. In such a configuration the complex waveform is applied common mode to the A/B wires. The complex waveform is applied to both of the A/B wires With such an arrangement, the current flows from the A/B wires to the adjacent pairs a proportion of the current then flows to ground from those pairs connected to line circuits.

A similar method of estimating the insertion loss of a telephone line can be achieved as described below in an arrangement having a drive/drive configuration.

Measurements of real and imaginary voltage components over a number of frequencies from approximately 100 Hz through approximately 20 kHz are made. The sum of the squares of these values ($P_{(f)}$) provides a value that is proportional to the power output of the test unit across the load (line under test).

If current is allowed to flow to earth the load presented to the test unit has all current flowing to earth, therefore the impedance presented by such a load is now dependent on the current path to earth which in turn is a factor of cable fill. Although this should give similar results for uniformly 'filled' cable this will in some instances give a very poor estimation of insertion loss, e.g. no fill in the cable would give a much smaller impedance and therefore an incorrect value for loss.

An additional method of calculating insertion loss involves utilizing the following formulas:

$$Gradient = k \cdot \log_{10}(((V_{Real}@f_2)^2 + (V_{Imag}@f_2)^2 + (V_{Real}@f_3)^2 + (V_{Imag}@f_3)^2 + (V_{Real}@f_4)^2 + (V_{Imag}@f_4)^2 + (V_{Real}@f_5)^2 + (V_{Imag}@f_5)^2)/(X))$$

where k is a constant related to a data access rate and X is a reference value.

$$Fill = \Sigma_{f=1}^{22} norm(i)$$

Where: $norm(f2) = (Vreal)^2 + (Vimag)^2$ for frequency 2, etc ...

Insertion Loss = scale factor*((gr ratio*Gradient) + (Gradient*Fill*fill factor))

Where: gr ratio is a value between approximately 0.1 and 50 Fill factor is a value between approximately 3 and 300 Scale factor is a value between 5 and 80

The fill value accounts for the currents to ground, thus providing an insertion loss estimate that is comparable to the drive/-drive technique. This method utilizes a drive/drive configuration in a non-islolated from ground arrangement. In a particular embodiment the value of the gr ratio is 0.36085, the value of the fill factor is 160.1128 and the scale factor is 52. The above calculation yields a number representing the insertion loss of the cable in dB at 300 kHz.

The calculated insertion loss obtained by any of the above-described methods is compared to a threshold (for example 41 dB). If the calculated insertion loss is greater than or equal to the threshold, than service cannot be deployed. On the other hand, if the calculated insertion loss is less than the threshold, then service can be deployed on the line.

In order to provide accurate, reproducible and reliable estimations from all of the above-described methods, additional conditions should be met. The output level and impedance of the test unit applied for these measurements should be constant, stable and repeatable from test to test. The output level of test unit used for measurement should be low. The line under test may include a telephone across the wires, keeping the output level low ensures that the telephone device remains at very high impedance. It is preferable to use frequencies of a few hundred to a few thousand Hz for such measurements, at such frequencies the metallic access of most host switches through which the line is accessed has a near linear response. The effect of the telephone device on the estimated insertion loss is kept to a minimum by application of signals of low amplitude (<500 mV) the line terminating device e.g. telephone tends to an even higher impedance at higher frequencies.

As mentioned before, the mutual cable capacitance per unit length tends to be fixed, unlike capacitance to earth which is variable and dependent upon cable fill. Accordingly, a method which accurately determines the mutual capacitive reactance is able to measure line length very accurately, and in the presence of telephone devices provided that frequencies of 800 Hz or more are used or particular.

One of the advantages of the present invention is that it has the ability to factor in both the real (resistive) and imaginary (capacitive) components of impedance for a line. Separately analyzed, the real component contribution is due to cable resistance, and the imaginary contribution due to capacitive reactance. However since one quantity is opposing the other to present such an impedance, frequency selection at which measurements are made is quite important. At much higher frequencies the capacitive reactance dominates, therefore there will be different cable makeups that would return the same value for the insertion loss estimation. Similarly, for very long lengths of line, the capacitive reactance will dominate and there is a folding back of the insertion loss estimation.

Figure 2:
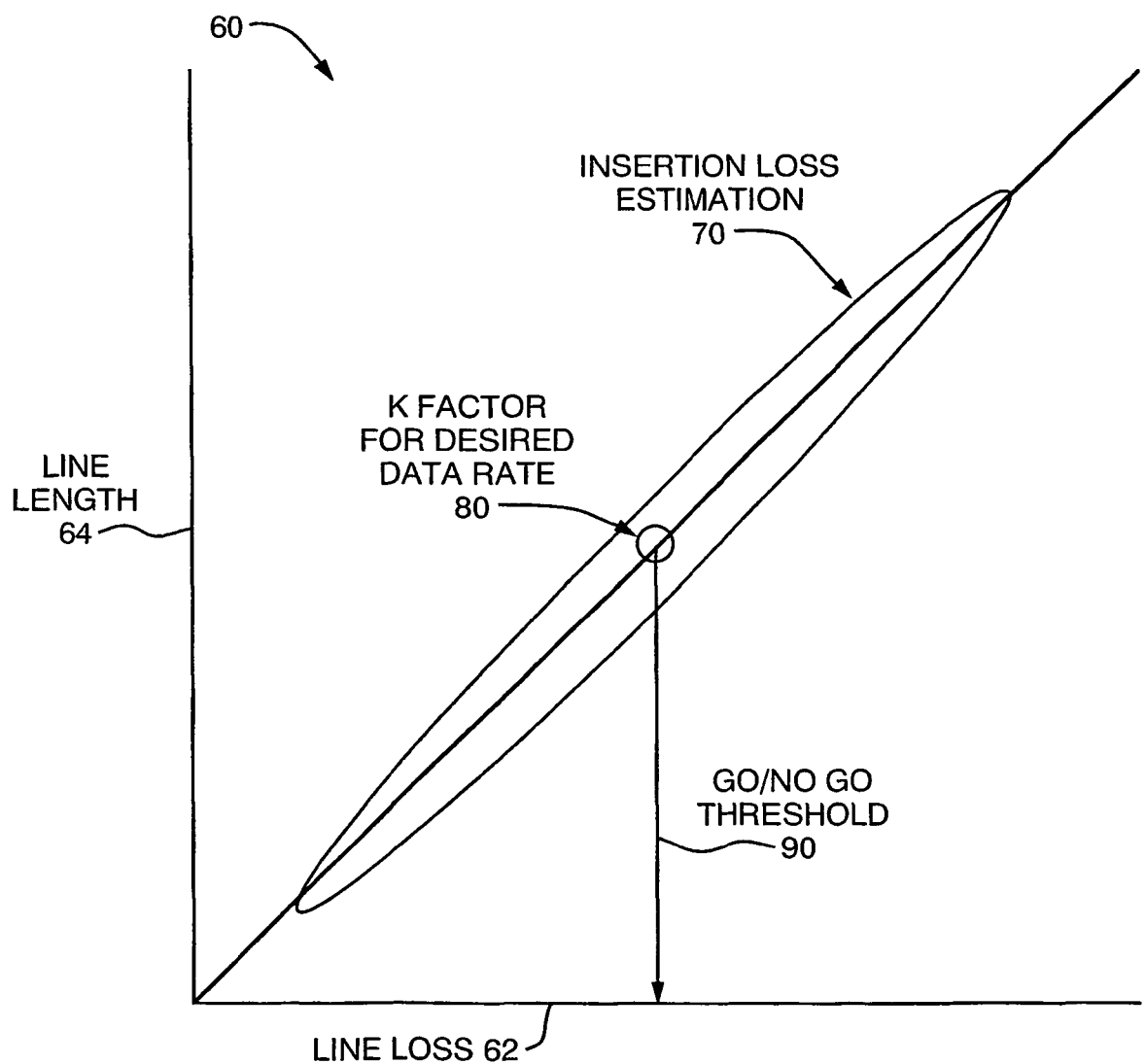
FIG. 2 is a graph showing the estimated insertion loss for a telephone line.

Referring now to FIG. 2, a graph 60 of the estimated insertion loss of a telephone line as determined by the present invention is shown. The horizontal axis 62 represents the line loss for the telephone line being tested. The vertical axis 64 represents the line length of the telephone line being tested. Also shown is an insertion loss estimate 70 as derived by way of the presently disclosed method. The determination of the insertion loss estimation includes a constant k (80). k is dependent on the data access rate, with a different value of k for a respective data rate. For a given data rate of service (for example 2 Mb/sec DSL access) there is a Go/No Go threshold 90. The threshold 90 is related to the constant k. An insertion loss above this threshold indicates that the selected telephone line cannot support the desired data access rate. An insertion loss below threshold 90 indicates that the selected telephone line will support the desired data access rate.

Figure 3:
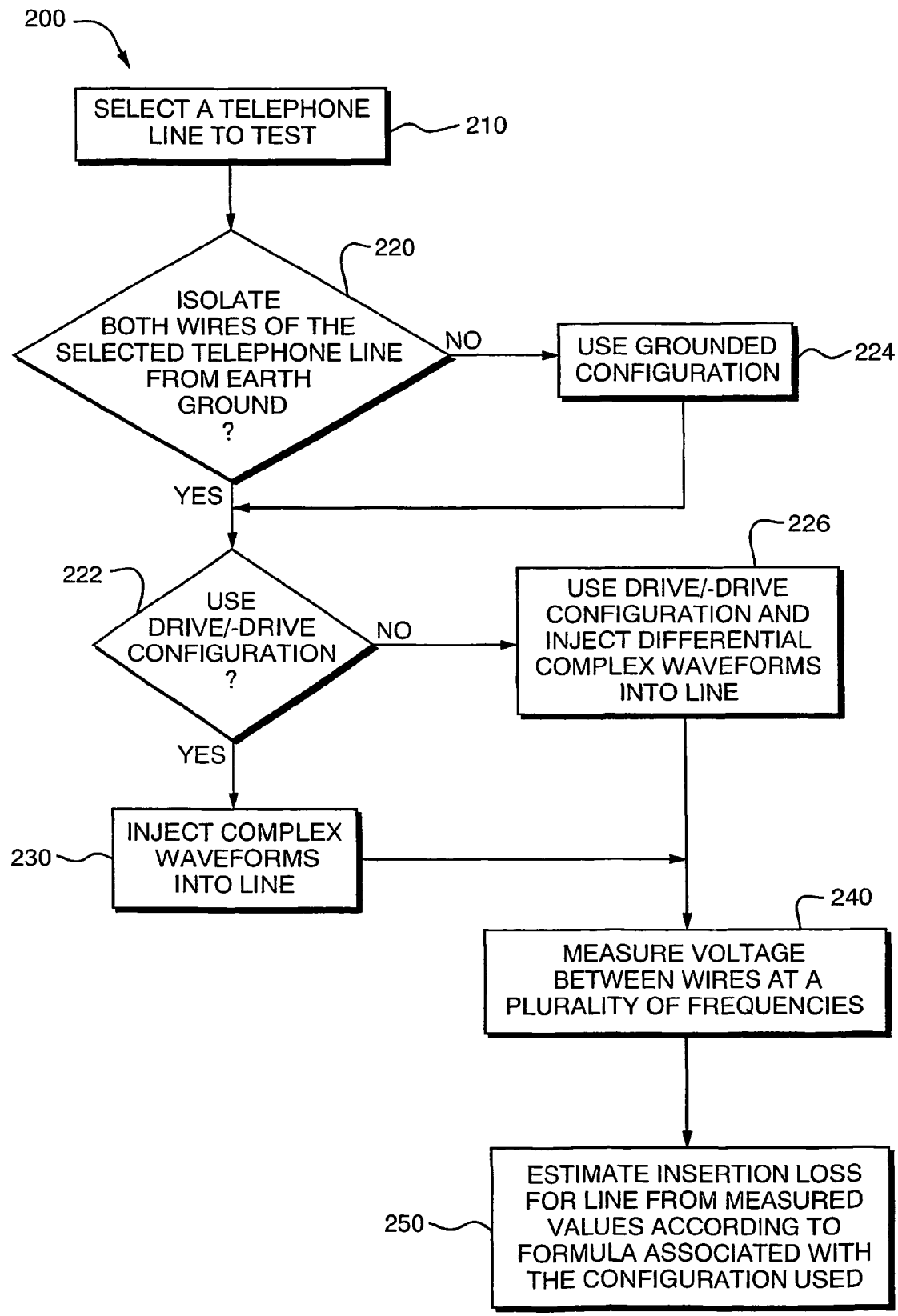
FIG. 3 is a flow chart of a method of measuring insertion loss of a telephone line.

Referring now to FIG. 3, a flowchart showing a method 200 of estimating the insertion loss of a subscriber line is shown. The first step 210 is to select a telephone line to measure. A single line is measured, though it is preferable to measure multiple lines, one after the other.

The next step 220, is to determine the configuration to be used. One configuration requires isolation of the tip and ring or A and B wires of the selected telephone line from earth ground. This may be accomplished in number of ways, such as by using one or more an isolation transformers between the test unit and the wire pair of the selected line. The test unit itself may be isolated from earth ground and the phone line coupled directly to the test unit. The alternate configuration (224) is to reference the complex waveform to ground. Once the grounding configuration is determined (isolated or non-isolated) the next step is to determine the drive configuration. A drive/drive configuration comprises driving the same complex waveform on each of the lines. A drive/-drive configuration comprises driving a first complex waveform on one line and driving a second complex waveform on the other line, wherein the second complex waveform comprises a waveform which is approximately 180° out of phase with the first complex waveform, as recited in step 226.

The following step 230 injects a complex waveform into the wires of the selected phone line. At step 240 the voltage between the wires of the selected telephone line is measured and recorded. This measurement may occur at a plurality of frequencies. Both real and imaginary components of the voltage waveform are measured at the plurality of frequencies.

At step 250 the insertion loss of the phone line is estimated from the measurements. The insertion loss of the selected telephone line is calculated according to the formulae, which correspond to the configurations being used.

Thus, from the above described methods and apparatus, an insertion loss estimation for a telephone line is obtained. A complex signal is provided and a series of voltage measurements are made and recorded. The insertion loss for the line is estimated from the voltage measurements.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

The invention claimed is:

1. A method of estimating a characteristic of a subscriber line, the subscriber line including a first wire and a second wire, the method comprising the steps of:
    applying a first complex waveform to a first wire of the subscriber line;
    applying a second complex waveform to a second wire of the subscriber line;
    obtaining voltage measurements between said first wire and said second wire of the subscriber line; and
    estimating insertion loss of said line from said voltage measurements, including adjusting the estimate of insertion loss based on the high frequency behavior of the complex waveform, wherein adjusting the estimate of insertion loss negates the effect of variable cable fill.

2. The method of claim 1 wherein said second complex waveform comprises said first complex waveform.

3. The method of claim 1 wherein said second complex waveform comprises a waveform approximately 180° out of phase with said first complex waveform.

4. The method of claim 1 further including a ground configuration selected from the group consisting of an isolated ground configuration and a non-isolated ground configuration.

5. The method of claim 1 wherein said step of obtaining voltage measurements comprises obtaining real and imaginary voltage measurements, designated $V_{Real}$ and $V_{Imag}$ respectively.

6. The method of claim 5 wherein said step of obtaining voltage measurements comprises obtaining voltage measurements at five or more different frequencies, said frequencies designated $f_1$, $f_2$, $f_3$, $f_4$, and $f_5$.

7. The method of claim 1 wherein said step of estimating an insertion loss is performed according to the formula:

$$k.\log_{10}(((V_{Real}@f_2)^2+(V_{Imag}@f_2)^2+(V_{Real}@f_3)^2+(V_{Imag}@f_3)^2+(V_{Real}@f_4)^2+(V_{Imag}@f_4)^2+(V_{Real}@f_5)^2+(V_{Imag}@f_5)^2)/(X));$$

wherein k is a constant and X is a reference value.

8. The method of claim 7 wherein X is selected from the group consisting of $$(4\times(V_{Real}@f_1)^2+(V_{Imag}@f_1)^2) \text{ and } (4\times(|V_{Open}|)^2)$$

wherein $V_{open}$ comprises the open line output measurement.

9. The method of claim 7 wherein k is selected from the group consisting of 84 and 130.

10. The method of claim 1 wherein said first complex waveform includes a plurality of frequencies between 0 and 20 kHz.

11. The method of claim 1 wherein said step of obtaining comprises performing a single ended measurement.

12. The method of claim 1 wherein said step of estimating an insertion loss is performed according to the formula:

Insertion Loss=scale factor*((gr ratio*Gradient)+(Gradient*Fill*fill factor)).

13. The method of claim 12 wherein the variable Gradient is defined as:

$$\text{Gradient}=k.\log_{10}(((V_{Real}@f_2)^2+(V_{Imag}@f_2)^2+(V_{Real}@f_3)^2+(V_{Imag}@f_3)^2+(V_{Real}@f_4)^2+(V_{Imag}@f_4)^2+(V_{Real}@f_5)^2+(V_{Imag}@f_5)^2)/(X)).$$

14. The method of claim 12 wherein the variable Fill is defined as:

$$\text{Fill}=\Sigma_f f^{22}\text{norm}(i).$$

15. The method of claim 14 wherein norm(i) is defined as:

$$\text{norm}(fi)=(V_{Real})^2+(V_{Imag})^2 \text{ for frequency } i.$$

16. The method of claim 12 wherein the variable gr ratio is between approximately 0.1 and 50.

17. The method of claim 12 wherein the variable fill factor is between approximately 3 and 300.

18. The method of claim 12 wherein the variable scale factor is between approximately 5 and 80.

19. A computer program product for estimating insertion loss of a line, the computer program product comprising a computer usable medium having computer readable code thereon, including program code comprising:
    instructions for causing a test unit to perform at least one of selecting a ground configuration, applying a first complex waveform to a first wire of the line, applying a second complex waveform to the second wire of the line, obtaining voltage measurements between said first wire and said second wire of the line, and estimating insertion loss of said line from said measurements, including adjusting the estimate of insertion loss based on the high frequency behavior of the complex waveform, wherein adjusting the estimate of insertion loss negates the effect of variable cable fill.

20. The computer program product of claim 19 wherein said second complex waveform comprises said first complex waveform.

21. The computer program product of claim 19 wherein said second complex waveform comprises a waveform approximately 180° out of phase with said first complex waveform.

22. The computer program product of claim 19 wherein said line has a ground configuration selected from the group consisting of an isolated ground configuration and a non-isolated ground configuration.

23. The computer program product of claim 19 wherein said instructions cause said test unit to obtain voltage measurements at five or more different frequencies, said frequencies designated $f_1$, $f_2$, $f_3$, $f_4$, and $f_5$.

24. The computer program product of claim 19 wherein said instructions cause said test unit to obtain real and imaginary voltage measurements, designated $V_{Real}$ and $V_{Imag}$ respectively.

25. The computer program product of claim 19 wherein said insertion loss is estimated according to the formula:

$$k.\log_{10}(((V_{Real}@f_2)^2+(V_{Imag}@f_2)^2+(V_{Real}@f_3)^2+(V_{Imag}@f_3)^2+(V_{Real}@f_4)^2+(V_{Imag}@f_4)^2+(V_{Real}@f_5)^2+(V_{Imag}@f_5)^2)/(X));$$

wherein k is a constant and X is a reference value.

26. The computer program product of claim 25 wherein X is selected from the group consisting of $$(4 \times (V_{Real}@f_1)^2 + (V_{Imag}@f_1)^2) \text{ and } (4 \times (|V_{Open}|)^2)$$

wherein $V_{Open}$ comprises the open line output measurement.

27. The computer program product of claim 25 wherein k is selected from the group consisting of 84 and 130.

28. The computer program product of claim 19 wherein said first complex waveform includes a plurality of frequencies between 0 and 20 kHz.

29. The computer program product of claim 19 wherein said measurements are single ended measurements.

30. The computer program product of claim 19 wherein said insertion loss is estimated according to the formula:

Insertion Loss=scale factor*((gr ratio*Gradient)+(Gradient*Fill*fill factor)).

31. The computer program product of claim 30 wherein the variable Gradient is defined as:

$$\text{Gradient}=k.\log_{10}(((V_{Real}@f_2)^2+(V_{Imag}@f_2)^2+(V_{Real}@f_3)^2+(V_{Imag}@f_3)^2+(V_{Real}@f_4)^2+(V_{Imag}@f_4)^2+(V_{Real}@f_5)^2+(V_{Imag}@f_5)^2)/(X)).$$

32. The computer program product of claim 30 wherein the variable Fill is defined as:

$$\text{Fill}=\Sigma_{f_1}^{f_{22}} \text{norm}(i).$$

33. The computer program product of claim 32 wherein norm(i) is defined as:

$$\text{norm}(fi)=(V_{Real})^2+(V_{Imag})^2 \text{ for frequency } i.$$

34. The computer program product of claim 30 wherein the variable gr ratio is between approximately 0.1 and 50.

35. The computer program product of claim 30 wherein the variable fill factor is between approximately 3 and 300.

36. The computer program product of claim 30 wherein the variable scale factor is between approximately 5 and approximately 80.

37. Apparatus for estimating insertion loss of a subscriber line, the subscriber line including a first wire and a second wire, the apparatus comprising:
   first applying means for applying a first complex waveform relative to a selected ground to a first wire of the subscriber line;
   second applying means for applying a second complex waveform relative to the selected ground to a second wire of the subscriber line;
   obtaining means for obtaining voltage measurements between said first wire and said second wire of the subscriber line; and
   estimating means for estimating insertion loss of said line from said voltage measurements and adjusting the estimate of insertion loss based on the high frequency behavior of the complex waveform, wherein adjusting the estimate of insertion loss negates the effect of variable cable fill.

38. The apparatus of claim 37 wherein said first and second applying means are adapted to apply the same complex waveform relative to the selected ground to the first and second wires of the subscriber line respectively.

39. The apparatus of claim 37 wherein said second applying means is adapted to apply said second complex waveform comprising a waveform of approximately 180° out of phase with said first complex waveform.

40. The apparatus of claim 37 wherein said selected ground is either an isolated ground configuration or a non-isolated ground configuration.

41. The apparatus of claim 37 wherein said obtaining means is adapted to obtain real and imaginary voltage measurements, designated $V_{Real}$ and $V_{Imag}$ respectively.

42. The apparatus of claim 41 wherein said obtaining means is adapted to obtain voltage measurements at five or more different frequencies.

43. The apparatus of claim 37 wherein said estimating means is adapted to estimate an insertion loss using the formula:

$$k.\log_{10}(((V_{Real}@f_2)^2+(V_{Imag}@f_2)^2+(V_{Real}@f_3)^2+(V_{Imag}@f_3)^2+(V_{Real}@f_4)^2+(V_{Imag}@f_4)^2+(V_{Real}@f_5)^2+(V_{Imag}@f_5)^2)/(X));$$

wherein k is a constant and X is a reference value.

44. The apparatus of claim 43 wherein X is selected from the group consisting of:

$$(4 \times (V_{Real}@f_1)^2 + (V_{Imag}@f_1)^2) \text{ and } (4 \times (|V_{Open}|)^2)$$

wherein $V_{Open}$ comprises the open line output measurement.

45. The apparatus of claim 43 wherein k is selected from the group consisting of 84 and 130.

46. The apparatus of claim 37 whence the first complex waveform includes a plurality of frequencies between 0 and 20 kHz.

47. The apparatus of claim 37 wherein said obtaining means is adapted to perform a single ended measurement.

48. The apparatus of claim 37 wherein said estimating means is adapted to estimate a length of said line.

49. The apparatus of claim 37 wherein said estimating means is adapted to estimate insertion loss using the formula:

Insertion Loss=scale factor*((gr ratio*Gradient)+(Gradient*Fill*fill factor)).

50. The apparatus of claim 49 wherein the variable Gradient is defined as:

$$k.\log_{10}(((V_{Real}@f_2)^2+(V_{Imag}@f_2)^2+(V_{Real}@f_3)^2+(V_{Imag}@f_3)^2+(V_{Real}@f_4)^2+(V_{Imag}@f_4)^2+(V_{Real}@f_5)^2+(V_{Imag}@f_5)^2)/(X)).$$

51. The apparatus of claim 49 wherein the variable Fill is defined as:

$$\text{Fill}=\Sigma_{f_1}^{f_{22}} \text{norm}(i).$$

52. The apparatus of claim 51 wherein norm(i) is defined as:

$$\text{norm}(fi)=(V_{Real})^2+(V_{Imag})^2 \text{ for frequency } i.$$

53. The apparatus of claim 49 wherein the variable gr ratio is between approximately 0.1 and 50.

54. The apparatus of claim 49 wherein the variable fill factor is between approximately 3 and 300.

55. The apparatus of claim 49 wherein the variable scale factor is between approximately 5 and 80.

* * * * *